April 1, 1958 N. CIVELLO 2,828,833
BRAKE ASSEMBLY
Filed Oct. 1, 1954
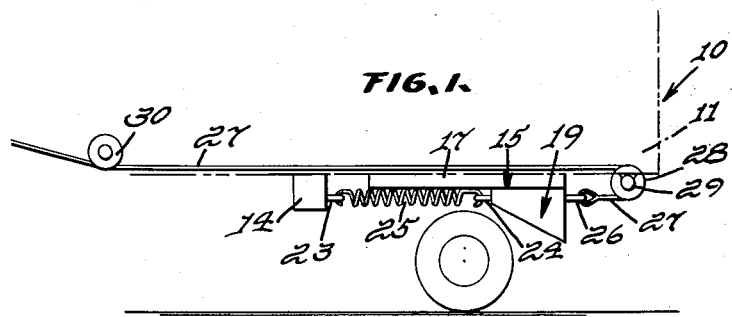
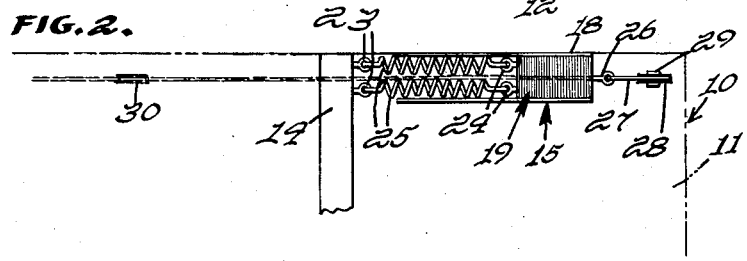
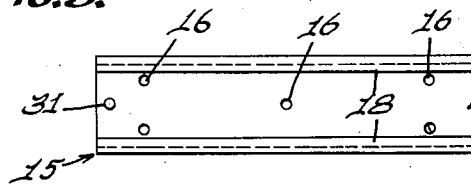
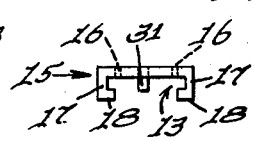
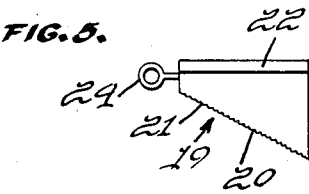
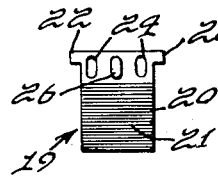
INVENTOR.
NED CIVELLO
BY *Victor J. Evans & Co.*
ATTORNEYS

United States Patent Office 2,828,833
Patented Apr. 1, 1958

2,828,833

BRAKE ASSEMBLY

Ned Civello, Pittsburgh, Pa.

Application October 1, 1954, Serial No. 459,627

1 Claim. (Cl. 188—29)

This invention relates to a vehicle, and more particularly to a brake for selectively arresting the forward movement of the vehicle.

The object of the invention is to provide a brake assembly for a vehicle wherein there is provided a wedge-shaped member or block that is mounted for movement into and out of frictional engagement with the tires of the vehicle in order to provide a positive lock or brake for forward movement of the vehicle.

Another object of the invention is to provide a brake assembly for a vehicle which includes a member that is secured below the vehicle to define a trackway, there being a wedge-shaped block slidably mounted in the trackway, the block having friction gripping means thereon such as corrugations which increase the effectiveness of the brake and wherein the wedge-shaped member is normally urged towards the wheels of the vehicle by means of a resilient means such as coil springs.

A further object of the invention is to provide a vehicle brake assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the brake assembly of the present invention.

Figure 2 is a bottom plan view of the brake assembly.

Figure 3 is a bottom plan view of the base which provides the trackway for the sliding block.

Figure 4 is an end elevational view of the base of Figure 3.

Figure 5 is a side elevational view of the sliding wedge-shaped block.

Figure 6 is an end elevational view of the block of Figure 5.

Referring in detail to the drawings, the numeral 10 designates a portion of a conventional vehicle which may be a trailer, and the vehicle 10 includes a body 11 that has ground-engaging wheels 12 positioned therebelow. Depending from the body 11 and secured thereto is a vertically disposed bracket 14 for a purpose to be later described.

Secured to the undersurface of the body 11 is a base 15, and the base 15 is provided with a plurality of openings or apertures 16 whereby suitable securing elements such as screws or bolts can be extended through the openings 16 and into the body 11 for maintaining the base 15 secured in place. Formed integral with the base 15 or secured thereto is a pair of spaced parallel vertically disposed side walls 17, Figure 4, and each of the side walls 17 has its lower end extending inwardly or transversely to provide flanges 18. These parts coact to define a trackway 13 in which is slidably mounted a wedge-shaped block 19.

The block 19 is shown in detail in Figures 5 and 6 and includes a pair of outwardly extending spaced parallel ears 22 on its upper end which are slidably mounted in the trackway 13. The block 19 further includes an inclined surface 20 that may be provided with a plurality of corrugations 21 thereon, and the corrugations 21 are adapted to frictionally engage the outer surface of the wheels 12 so as to prevent rotation thereof when the brake is actuated.

Extending rearwardly from the bracket 14 and secured thereto is a pair of spaced parallel securing elements 23, and arranged in engagement with the securing elements 23 are a pair of coil springs 25. The rear ends of the coil springs 25 are connected to eye-bolts 24 which are secured to the front end of the wedge 19. Thus, the coil springs 25 tend to normally urge or bias the wedge-shaped block 19 towards the wheels 12. An eye-bolt 26 extends rearwardly from the block 19, and a cable 27 is connected to the eye-bolt 26. The cable 27 is trained over a pulley 28 which is mounted on a pin 29 that is secured below the body 11. The cable 27 may also be trained over a second pulley 30, and the cable 27 can be actuated in any suitable manner. A stop pin 31 depends from the front end of the base 15, and the stop pin 31 serves to limit forward movement of the block 19 in the base.

From the foregoing it is apparent that there has been provided a brake assembly for a vehicle which can be used as an emergency brake to stop the forward motion of the vehicle 10 and the vehicle 10 may be a trailer or the like. In use the parts are normally positioned as shown in Figures 1 and 2 and then when it is desired to use the brake, tension on the cable 27 may be released in any suitable manner as for example by means of a manually operable foot pedal or lever which can be arranged in the part of the vehicle occupied by the driver and when tension on the cable 27 is released, the coil springs 25 will move the block 19 forwardly so that the inclined surface 20 having the corrugations 21 thereon will engage the wheel 12. Thus, further rotation of the wheels 12 will be prevented so that the vehicle will be stopped. When it is desired to release the brakes to permit forward movement of the vehicle, it is only necessary to pull on the cable 27 whereby the block 19 will be moved out of engagement with the wheels 12 back to the position shown in Figure 1 so that there will be no interference with normal rotation of the wheels.

The parts may be varied in size as desired. Instead of using the cable 27 to move the wedge-block 19, other means can be used for disengaging the block. The springs 25 pull the block 19 over and into engagement with the wheels 12 when the brakes are operated, and in actual use or practice, one of the bases 15 and one of the wedges 19 can be installed over each of the back wheels of the trailer, and these may both be operated at the same time to maintain the trailer under control. The brakes can be operated by the cable 27 from a tractor or the like, or else they can be operated by means of an electric motor with a control button on the dashboard. Also, a hydraulic means can be used for operating the wedge-block. The pin 31 limits forward movement of the wedge-block, and it is to be noted that the ends of the base 15 are open so that foreign matter such as water, dirt and the like will not accumulate in the base. The brakes of the present invention can be used as emergency brakes to stop a trailer as when the regular air brakes fail. The base 15 can be made of any suitable material such as metal and can be bolted to the underside of the trailer by means of bolts which extend through the openings 16. The wedge-block may be approximately one-half as long as the base 15, and the block can be made of any suitable material and the inclined surface of the block can be provided with corrugations 21 or else it may be provided with rubber to increase the gripping ability of the block. The base 15 may be bolted on the underside of the trailer directly over the center of the wheels. The ears 22 hold the block 19 in place in the base and the wide end of the block 19 is of greater width than the space between the tops of the wheels and the bottom of the trailer.

I claim:

In combination, a vehicle including a body and ground-engaging wheels mounted below said body, a vertically disposed bracket depending from said body, a base secured to the lower surface of said body adjacent the trailing end of said vehicle and including a pair of spaced parallel side walls each having an inwardly extending flange on its lower end defining a trackway therebetween, a wedge-shaped block having spaced parallel outwardly extending ears on its upper end slidably mounted in said trackway for movement forwardly of the trailing end of the vehicle, said block including an inclined surface having a plurality of corrugations thereon, said block being mounted for movement in the plane of the wheels so that said corrugations will have frictional engagement with said wheels, securing elements extending forwardly from said sliding block away from the trailing end of said vehicle, a pair of coil springs connected to rearwardly extending securing elements on said bracket and to the securing elements on said block, a securing element extending rearwardly from said block toward the trailing end of said vehicle, a cable connected to said last named securing element, a first pulley mounted on said body rearwardly of said base, a second pulley mounted on said body forwardly of said bracket, said cable engaging first said first pulley and then said second pulley, and a stop pin depending from the front of said base for limiting forward movement of said block to prevent said block from becoming detached from said trackway.

References Cited in the file of this patent

UNITED STATES PATENTS

| | | |
|---|---|---|
| 115,129 | Spore | May 23, 1871 |
| 257,803 | Woods | May 9, 1882 |
| 1,496,548 | Knight | June 3, 1924 |
| 2,169,781 | Abresch | Aug. 15, 1939 |

FOREIGN PATENTS

| | | |
|---|---|---|
| 120,413 | Great Britain | Nov. 14, 1918 |